United States Patent
Van Lieshout et al.

(10) Patent No.: US 6,417,633 B1
(45) Date of Patent: Jul. 9, 2002

(54) TRACKING CATHODE RAY TUBE CIRCUIT HAVING A MODULATOR DEMODULATOR

(75) Inventors: Petrus Johannes Gerardus Van Lieshout; Adrianus Sempel; Pieter Johannes Engelaar, all of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/759,173

(22) Filed: Jan. 12, 2001

(30) Foreign Application Priority Data

Jan. 17, 2000 (EP) .............................................. 00200160
Jan. 17, 2000 (EP) .............................................. 00200162

(51) Int. Cl.$^7$ ................................................ G09G 1/04
(52) U.S. Cl. ........................ 315/371; 315/370; 315/10; 315/387
(58) Field of Search ............................ 315/8, 383, 387, 315/10, 370, 369, 371

(56) References Cited

U.S. PATENT DOCUMENTS

| 3,732,359 A | * | 5/1973 | Cehn ........................ 315/12 X |
| 3,871,023 A | * | 3/1975 | Caprio ........................ 358/28 |
| 4,481,537 A | * | 11/1984 | Tanaka ........................ 358/162 |
| 4,635,107 A | * | 1/1987 | Turner ........................ 315/369 X |

FOREIGN PATENT DOCUMENTS

GB            1403061          8/1975

* cited by examiner

Primary Examiner—Haissa Philogene

(57) ABSTRACT

A tracking index cathode ray tube circuit includes a tracking circuit connected to a shadowmaskless tracking cathode ray tube for deriving a tracking signal therefrom. The tracking circuit comprises a modulator demodulator circuit. The tracking signal from the CRT tube is thus modulated, AC coupled to a low voltage and demodulated to obtain a baseband tracking signal for use as a control signal for the electron beam spots on the screen of the CRT tube.

19 Claims, 1 Drawing Sheet

TRACKING CATHODE RAY TUBE CIRCUIT HAVING A MODULATOR DEMODULATOR

BACKGROUND OF THE INVENTION

The present invention relates to a tracking cathode ray tube circuit, comprising tracking means connected to a shadowmaskless tracking cathode ray tube for deriving a tracking signal therefrom.

Such a tracking cathode ray tube circuit, which is also referred to as index tube, is known from GB-1 403 061. Disclosed therein is a so-called shadowmaskless tracking cathode ray tube (CRT), wherein a feedback control loop controls the exact landing spot of electron beams on a front plate thereof. The position of the spot is measured, using a guiding track structure or sensor positioned on the inner side of the front plate. When a spot is scanned along the tracks, a tracking signal which depends on the spot position arises, which tracking signal can be used to generate a spot position output signal for a deflection unit on the tracking CRT which keeps the spot on track. The guided track structure can be designed in such a way that a modulated tracking signal, which is at on a very high voltage relative to earth, is generated. A guiding track structure having a constant wobble pitch is known to result in an error signal which is constituted by an amplitude-modulated signal at a carrier frequency. The error signal can then be discriminated from the video modulation without confusion.

It is, however, a disadvantage of the known shadowmaskless tracking cathode ray circuit that, apart from the shape of the tracking structure, the modulation frequency and the modulation depth have to be chosen correctly in relation to the video modulation in order to prevent artefacts, which are undesirably visible on the screen of the CRT.

SUMMARY OF THE INVENTION

It therefore is an object of the present invention to provide a cathode ray tube circuit which has a less critical structural design and internal shape and does not give rise to artifacts or necessitate fine tuning of internally mounted and prescribed modulation quantities and features.

To this end, the tracking cathode ray tube circuit according to the invention is characterized in that the tracking means comprises a modulator-demodulator circuit. It is an advantage of the tracking CRT circuit according to the invention that, internally, the tracking hardware of the shadowmaskless tracking CRT tube requires no adjustment, because an unmodulated/base band tracking signal will result from the shadowmaskless tracking CRT tube in the circuit according to the invention. The tracking means can now be simply provided outside the tracking CRT tube, while comprising modulator demodulator means for creating a modulated tracking signal therewith. Such a modulated tracking signal can be advantageously and easily down converted from anode potential (typically 25 kV) to earth potential.

An embodiment of the tracking CRT circuit according to the invention, which is easy to implement, is characterized in that the modulator, which is connected to the shadowmaskless tracking cathode ray tube, and the demodulator are mutually separated by a first AC coupling. Such an AC coupling may be advantageously of a conventional type, for example, an electric, magnetic, optical or acoustical coupling.

A further embodiment of the tracking CRT circuit according to the invention is characterized in that the tracking means comprises an oscillator which is coupled to both the modulator and the demodulator. It is an advantage of the tracking CRT circuit according to the invention that only one oscillator is necessary for driving the modulator as well as the demodulator.

A further embodiment of the CRT circuit according to the invention is characterized in that the oscillator is connected to the modulator and is coupled to the demodulator through a second AC coupling. It is an advantage of this embodiment of the tracking CRT circuit according to the invention that possible frequency and phase problems are obviated, because particularly the phase differences across both AC couplings for the tracking signal and the oscillator signal, respectively, will be equal. This provides the possibility of a simple and correct synchronous detection in the demodulator.

A further embodiment of the index CRT control circuit is characterized in that the oscillator is coupled to a DC/AC converter, which in turn is coupled to a DC supply source and whose converter output is coupled to the second AC coupling. In this embodiment, the AC coupling concerned simultaneously provides a supply voltage and the modulated or modulating signal to the demodulator or modulator respectively without additional circuitry being required.

Advantageously,several variants and embodiments of the tracking CRT circuit are feasible. The AC coupling may again be of a conventional type, such as, for example, a capacitive, inductive, optical or acoustical coupling. The modulation, which will generally be analog, may comprise a variety of modulation types, such as: AM, FM, PM, DSB, SSB, VSB, FSK, etcetera.

In a further preferred embodiment, in which the AC coupling is an inductive coupling, this coupling is advantageously arranged as an additional tap on a high-voltage transformer of a display device, such as for example, a television apparatus. This economizes on complete inductive coupling.

Another embodiment of the shadowmaskless tracking CRT circuit is characterized in that the demodulator comprises an AM detection circuit and a phase comparator for providing information about the displacement of the electron beam from the centre of the track and about the direction of the displacement, respectively. This embodiment provides detailed information about displacement, velocity and heading of the separate respective electron beams in question.

The present invention also relates to a display device, such as, for example, a television apparatus, comprising a tracking cathode ray tube circuit as defined in the claims in which the cathode ray tube circuit comprises coupling means connected to a shadowmaskless tracking cathode ray tube for deriving a tracking signal therefrom, which device is characterized in that the coupling means comprises a modulator demodulator circuit.

BRIEF DESCRIPTION OF THE DRAWING

The tracking CRT circuit and display device according to the invention will now be elucidated together with their additional advantages, while reference is made to the appended drawing, wherein similar components are referred to by means of the same reference numerals. In the drawing.

DESCRIPTION OF THE PREFERRED EMBODIMENTS

Figure 1:
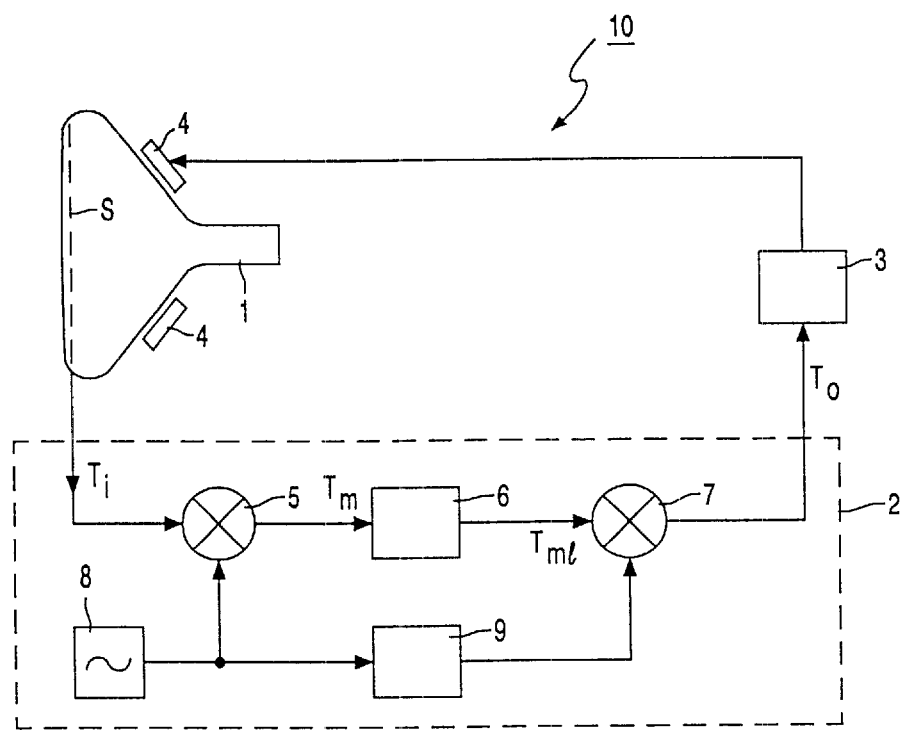
FIG. 1 shows dis a part of a display device provided with a shadow maskless tracking cathode ray tube, and a tracking circuit.

FIG. 1 shows a diagram of a part of a display device provided with a shadowmaskless tracking cathode ray tube, hereinafter referred to as CRT 1. The device is provided with a tracking means in the form of a tracking circuit 2 and a tracking CRT control circuit 3 connected to the tracking circuit 2. The tracking circuit 2 applies a tracking signal from CRT 1 to the CRT control circuit 3. The latter circuit 3, which drives the deflection unit 4 of the CRT 1, will not be further elucidated. The CRT 1 is of a type which has no shadow mask, wherein the position of electron beams is measured by means of a conducting tracking or sensor structure S inside the CRT 1. When a spot is scanned along the tracks of the structure S, the tracking signal Ti is generated for use in the tracking CRT control circuit 3 for spot position correction purposes.

FIG. 1 further shows a diagram of the tracking circuit 2, comprising a modulator 5 for modulating the input tracking signal Ti which is stacked at a very high voltage to obtain a modulated tracking signal Tm, a first AC coupling 6 for outputting the low-voltage modulated tracking signal Tml, and a demodulator 7 for obtaining the baseband/unmodulated tracking signal To. The modulator 5 and the demodulator 7, which are mutually separated by the AC coupling 6, are coupled to an oscillator 8 providing the carrier frequency for the tracking signal Tm and Tml. In the case shown, the oscillator 8 is directly coupled to the modulator 5 and to the demodulator 7 through a second AC coupling 9. If desired, the oscillator 8 may be directly coupled to the demodulator 7 and the modulator 5 through the second AC coupling 9, if run time delay and phase delay do not cause problems.

Figure 2:
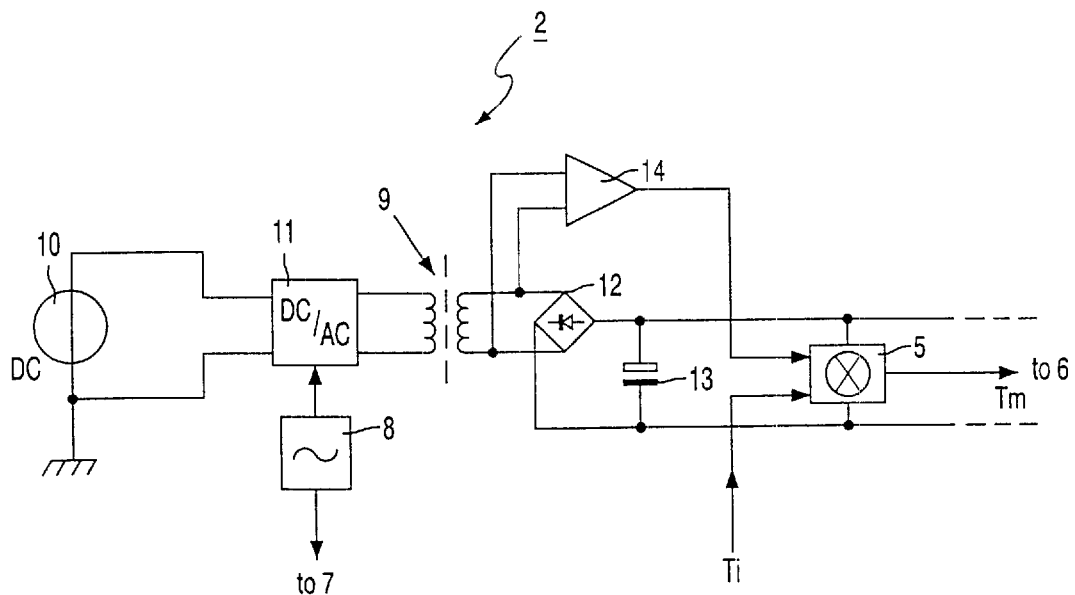
FIG. 2 shows a detailed diagram of the tracking circuit including a power supply and an oscillator for use in the display device of FIG. 1.

FIG. 2 shows a detailed diagram of the tracking circuit 2, including a DC power supply 10 which, together with the oscillator 8, is coupled to a DC/AC converter 11. The converter 11 converts the DC supply voltage into an AC voltage which is chopped by a high-frequency oscillator signal, which is also the (de)modulating frequency of the tracking signal. The converter output is coupled to the second AC coupling 9, which in this case is an inductive coupling, but which, as the first AC coupling 6, may also be, for example, a capacitive coupling so as to insulate earth from high potential on the secondary side of the coupling 9. This secondary side is coupled to a rectifier 12 and to a smoothing circuit 13 for supplying a DC supply voltage to the demodulator 7. The oscillator signal is taken from the secondary side of the transformer coupling 9 and fed to the modulator 5 through an amplifier 14. The modulator 5 also receives the modulated signal from AC coupling 6 so as to generate an output tracking signal To for the control circuit 3.

Several embodiments and variants are feasible to those skilled in the art. In the aforementioned case the oscillator 8 is directly coupled to the demodulator 7, and in contrast to the embodiments shown in FIGS. 1 and 2 a DC supply voltage may be used for supplying power from the low-potential side to the high-potential side of AC couplings 6 and 9. In that case, the well-known EHT transformer may be unchanged. Also the demodulator 7 may comprise a generally known AM detection circuit and a phase comparator for providing information about the displacement of the electron beam spots from the centre of the track and about the direction of the displacement, respectively. A synchronous detector may, however, be used instead. Instead of using a separate transformer, the coupling 9 may be included on an extra tap of an extreme high-tension transformer, which is built in anyhow in current display devices, such as television apparatuses. The modulator-demodulator circuit 5, 7 may be arranged for analog modulation, such as amplitude modulation (AM), frequency modulation (FM), phase modulation (PM), double sideband modulation (DSB), single sideband modulation (SSB), vestigial sideband modulation (VSB), phase shift keying (FSK), and the like.

What is claimed is:

1. A tracking cathode ray tube circuit, comprising: tracking means connected to a shadowmaskless tracking cathode ray tube for deriving a tracking signal (To) therefrom, characterized in that the tracking means comprises a modulator-demodulator circuit having a modulator for modulating an input tracking signal (Ti) supplied by said cathode ray tube to obtain a modulated tracking signal (Tm), and a demodulator for demodulating said modulated tracking signal to obtain the tracking signal (To).

2. A tracking cathode ray tube circuit as claimed in claim 1, characterized in that the modulator, which is connected to the shadowmaskless tracking cathode ray tube, and the demodulator are mutually separated by a first AC coupling.

3. A tracking cathode ray tube circuit as claimed in claim 1, characterized in that the tracking means comprises an oscillator which is coupled to both the modulator and the demodulator.

4. A tracking cathode ray tube circuit as claimed in claim 3, characterized in that the oscillator is connected to the modulator and is coupled to the demodulator through a second AC coupling.

5. A tracking cathode ray tube circuit as claimed in claim 4, characterized in that the oscillator is coupled to a DC/AC converter, which in turn is coupled to a DC supply source, and the converter output is coupled to the second AC coupling.

6. A tracking cathode ray tube circuit as claimed in claim 1, and further comprising an AC coupling between the modulator and the demodulator, and characterized in that the AC coupling is a capacitive, inductive, optical or acoustical coupling.

7. A tracking cathode ray tube circuit as claimed in claim 6, characterized in that the AC coupling is an inductive coupling, which comprises an additional tap on a high-voltage transformer of a display device.

8. A tracking cathode ray tube circuit as claimed in claim 1, characterized in that the modulator-demodulator circuit is arranged for analog modulation.

9. A tracking cathode ray tube circuit as claimed in claim 8, characterized in that the demodulator comprises an AM detection circuit and a phase comparator for providing information about the displacement of an electron beam from the centre of a track of the cathode ray tube and about the direction of the displacement, respectively.

10. A display device comprising a shadow maskless tracking cathode ray tube and a tracking cathode ray tube circuit as claimed in claim 1, and which further comprises coupling means connected to the tracking cathode ray tube for deriving the input tracking signal therefrom, characterized in that the coupling means comprises the modulator-demodulator circuit of the tracking cathode ray tube circuit.

11. The display device as claimed in claim 10 wherein the input tracking signal is an unmodulated signal.

12. The tracking cathode ray tube circuit as claimed in claim 1 wherein the input tracking signal is an unmodulated signal.

13. The tracking cathode ray tube circuit as claimed in claim 3 wherein the oscillator is coupled to the modulator via a DC/AC converter and a second AC coupling, and the DC/AC converter is coupled to a source of DC supply voltage.

14. The tracking cathode ray tube circuit as claimed in claim 8 wherein the analog modulation comprises one of the following; amplitude modulation (AM), frequency modulation (FM), phase modulation (PM), double sideband modulation (DSB), single sideband modulation (SSB), vestigial sideband modulation (VSB), and phase shift keying (FSK).

15. The tracking cathode ray tube circuit as claimed in claim 1 wherein the demodulator comprises an AM detection circuit and a phase comparator for providing information about the displacement of an electron beam from the centre of a track of the cathode ray tube and about the direction of the displacement, respectively.

16. The tracking cathode ray tube circuit as claimed in claim 1, and further comprising an AC coupling between the modulator and the demodulator, and the AC coupling is an inductive coupling, which comprises an additional tap on a high-voltage transformer of a display device.

17. The tracking cathode ray tube circuit as claimed in claim 1 wherein the tracking means comprise a single oscillator which is coupled to both the modulator and the demodulator.

18. The tracking cathode ray tube circuit as claimed in claim 2 wherein the tracking signal from the demodulator comprises a baseband unmodulated tracking signal.

19. The tracking cathode ray tube circuit as claimed in claim 2 wherein the tracking means comprise an oscillator coupled to the demodulator and to the modulator via a DC/AC converter and a second AC coupling, and the DC/AC converter is coupled to a source of DC supply voltage so that the second AC coupling provides both a supply voltage and a modulating signal to the modulator.

* * * * *